United States Patent [19]
Desai

[11] Patent Number: 5,582,873
[45] Date of Patent: Dec. 10, 1996

[54] ACID SCAVENGER STABILIZED HALOGEN CONTAINING ORGANIC POLYMERS AND METHOD FOR PROCESSING

[75] Inventor: Nirav Desai, Clearwater, Fla.

[73] Assignee: Carol M. Botsolas, Clearwater, Fla.

[21] Appl. No.: 516,291

[22] Filed: Aug. 17, 1995

Related U.S. Application Data

[63] Continuation-in-part of Ser. No. 285,989, Aug. 4, 1994, abandoned.

[51] Int. Cl.[6] ........................................ B05D 1/36
[52] U.S. Cl. ................... 427/412.4; 427/400; 428/522; 524/180; 524/181; 524/400; 524/450; 524/567
[58] Field of Search ..................... 524/450, 180, 524/181, 182, 400; 428/522; 427/400, 412.4

[56] References Cited

U.S. PATENT DOCUMENTS

| | | | |
|---|---|---|---|
| 2,867,605 | 1/1959 | Safford | 260/45.75 |
| 3,036,980 | 5/1962 | Dunham, Jr. et al. | 260/31.4 |
| 3,428,595 | 2/1969 | Tsukada et al. | 260/41 |
| 3,629,170 | 12/1971 | Yamanouchi et al. | 260/23 XA |
| 3,761,449 | 9/1973 | Kaufman | 260/61 |
| 3,869,420 | 3/1975 | Mathis et al. | 260/30.6 R |
| 3,872,041 | 3/1975 | Koerber | 260/23 XA |
| 4,000,100 | 12/1976 | Baldyga | 524/450 |
| 4,029,618 | 6/1977 | Dieckmann | 260/23 XA |
| 4,060,508 | 11/1977 | Sugahara et al. | 260/23 |
| 4,116,907 | 9/1978 | Shiohara et al. | 260/23 |
| 4,211,853 | 7/1980 | Raley, Jr. | 525/317 |
| 4,250,081 | 2/1981 | Bode et al. | 260/42.46 |
| 4,307,010 | 12/1981 | Sandler et al. | 260/42.47 |
| 4,338,226 | 7/1982 | Worschech et al. | 524/302 |
| 4,371,656 | 2/1983 | Kashiwase et al. | 524/450 |
| 4,373,044 | 2/1983 | Buxbaum et al. | 524/132 |
| 4,376,178 | 3/1983 | Blount | 524/47 |
| 4,434,251 | 2/1984 | Sasajima et al. | 521/75 |
| 4,495,330 | 1/1985 | Chung et al. | 524/783 |
| 4,590,233 | 5/1986 | Erwied et al. | 524/357 |
| 4,593,059 | 6/1986 | Mesch et al. | 524/181 |
| 4,670,494 | 6/1987 | Semenza, Jr. | 524/141 |
| 4,686,255 | 8/1987 | Erwied et al. | 524/104 |
| 4,710,533 | 12/1987 | Neuman | 524/394 |
| 4,797,426 | 1/1989 | Waki et al. | 521/93 |
| 4,927,700 | 5/1990 | Nelson et al. | 428/209 |
| 5,004,776 | 4/1991 | Tadenuma et al. | 524/377 |
| 5,026,756 | 6/1991 | Arendt | 524/293 |
| 5,034,443 | 7/1991 | Bae et al. | 524/180 |
| 5,073,584 | 12/1991 | Meszaros et al. | 524/101 |
| 5,091,454 | 2/1992 | Arendt | 524/293 |
| 5,190,814 | 3/1993 | Foster et al. | 428/327 |
| 5,216,058 | 6/1993 | Visneski | 524/357 |
| 5,227,417 | 7/1993 | Kroushl, III | 524/114 |
| 5,234,981 | 8/1993 | Arfiche et al. | 524/265 |
| 5,256,717 | 10/1993 | Stauffer et al. | 524/293 |
| 5,350,785 | 9/1994 | Sander et al. | 524/100 |

FOREIGN PATENT DOCUMENTS

| | | |
|---|---|---|
| 529576 | 3/1993 | European Pat. Off. . |
| 1033540 | 6/1966 | United Kingdom . |
| 1483659 | 8/1977 | United Kingdom . |

OTHER PUBLICATIONS

Gachter/Muller *Plastics Additvies* pp. 192–249.
Modern Plastic Special Buyer's Cuide And Encyclopedia, Mid–Dec. 1992 Issue, vol. 69 No. 13.
Modern Plastics Encyclopedia 1982–1983, pp. 180–183.
Plastics Compounding May/Jun. 1990, pp. 48–49.
Modern Plastics Encyclopedia 1988, pp. 176–177.
Modern Plastics Encyclopedia 1982–1983, pp. 193–194 and 198.
Modern Plastics Encyclopedia 1988, pp. 168–169.
Solid Plasticizer In Reinforced Rigied Polyvinyl Chloride Resin, Master Thesis by Nirav N. Desai © Aug. 1993.

*Primary Examiner*—Veronica P. Hoke
*Attorney, Agent, or Firm*—Hedman, Gibson & Costigan, P.C.

[57] ABSTRACT

The present invention relates to a method of making stabilized halogen containing organic polymer laminate comprising as one layer a halogen-containing organic polymer, an acid scavenger comprising a molecular sieve or zeolite; and a heat stabilizer and as the other layer, a similar composition devoid of a molecular sieve or zeolite.

9 Claims, 1 Drawing Sheet

ACID SCAVENGER STABILIZED HALOGEN CONTAINING ORGANIC POLYMERS AND METHOD FOR PROCESSING

FIELD OF THE INVENTION

This application is a continuation-in-part of U.S. patent application Ser. No. 08/285,989, filed Aug. 4, 1994, now abandoned.

This invention relates to the stabilization of halogen containing organic polymers against the deteriorative effects of heat and thermal degradation and a method for processing the stabilized polymers. The halogen-containing organic polymers are stabilized by a composition comprising an acid scavenger and a heat stabilizer.

BACKGROUND OF THE INVENTION

It has long been known that halogen containing organic polymers, such as polyvinyl chloride are subject to deterioration or degradation when exposed to heat and light.

Halogen containing organic polymers are also subject to deterioration or degradation during processing. The difference in processing temperature and degradation temperature for halogen containing organic polymers such as polyvinyl chloride and chlorinated polyvinyl chloride is very small. Thus any mistake either mechanically or chemically will result in degradation.

It is believed that when halogen containing polymers degrade, a halide acid such as HCl is removed from the polymer. The emitted acid attacks the components of the processing machine and more importantly catalyzes further elimination reactions or degradation of the polymer. The resultant dehydrohalogenated product which now contains an additional allylic chlorine is prone to further degradation and is capable of violent autocatalytic decomposition or unzipping.

Various chemical compounds and compositions have been developed to stabilize the halogen containing organic polymers against such deterioration. Ideally a stabilizer should replace labile halogens by displacement with a ligand less easily removed by heat or other degenerative means, work as an antioxidant and convert the evicted halogen to an innocuous state.

Halogen containing organic polymer stabilizers have generally been directed toward stabilization against heat degradation, such as that encountered during processing of the polymer and its fabrication into articles. Some of the heat stabilizers which are commercially available are described in various trade publications and reference materials such as the 1993 Modern Plastics Encyclopedia and Plastics Additives Handbook, edited by R. Gachter and H. Muller, Hanser Publishers© 1983, pp. 204–230 which are incorporated herein by reference.

The more common heat stabilizers are organotin compounds such as mono and dialkyltin carboxylates, mono and dialkyltin mercaptides, mixed metal stabilizers such as barium, cadmium, barium/zinc or cadmium/zinc salts of carboxylic acids and phenols, lead stabilizers such as tribasic lead sulfate, dibasic lead phosphite, dibasic lead phthalate, dibasic lead stearate, dibasic lead carbonate and lead stearate and metal free stabilizers such as 2-phenylindole and aminocrotonates.

Other compounds can be used to stabilize halogen containing organic polymers but these compounds have gained only modest importance in the art such as antimony-trismercaptides.

It is also known in the art to use costabilizers to enhance the stability of halogen containing organic polymers. Some common costabilizers are organic phosphites such as diphenyl-decylphosphite and phenyl-didecylphosphite, epoxy compounds such as epoxidized soybean oil, epoxidized castor oil and epoxidized linseed oil, polyols such as pentaerythritol, dipentaerythritol, trismethylolpropane and sorbital, and antioxidants such as bisphenol A, 2,6-di-tertbutyl-4-methylphenol and octadecyl 3(3,5-di-tertbutyl-4-hydroxyphenyl)propionate. Other costabilizers or stabilizer enhancers are described in U.S. Pat. No. 4,593,059 which discloses a diester of an ethylenically unsaturated dicarboxylic acid having one carboxyl group on each carbon atom of the ethylene group; U.S. Pat. No. 5,073,584 which discloses a combination of an alkali metal alumo silicate and an isocyanuric acid derivative; U.S. Pat. No. 4,060,508 discloses a combination of an inorganic stabilizer represented by the formula $MO_n SiO_2$ wherein M is a group II or IV metal and n is from 0.3 to 5 and an organic additive; and U.S. Pat. No. 5,234,981 which discloses a combination of an organic zinc or cadmium compound, a calcium, magnesium, barium or lanthanide compound and an amorphous basic aluminum magnesium carbonate. The aforementioned patents are incorporated herein by reference.

Other costabilizers known in the art are molecular sieves or zeolite compounds. For example U.S. Pat. No. 4,000,100, incorporated herein by reference, discloses the use of Zeolite A molecular sieves which have approximately 18–25% water content with conventional inorganic, organometallic or organic stabilizers. Unfortunately, the high water content of these zeolite compounds often evaporates during processing resulting in unwanted orange peel products or products with a grainy finish. A further disadvantage of using zeolites as a stabilizer for halogen polymers is that many of the zeolites incorporate sodium which can impart an undesirable reddish color to the polymer product.

With the increased use of halogen containing organic polymers it has become increasingly important to develop a stabilizer which will stabilize the halogen containing polymer during processing and also to provide a smooth and uniform finish for the final product.

SUMMARY OF THE INVENTION

It is an objective of the present invention to provide a stabilized halogen containing organic polymer that does not deteriorate during processing due to thermal degradation.

It is a further objective of the present invention to provide a stabilized halogen containing organic polymer that has improved process stability and better color hold.

It is an additional objective of the present invention to provide a new method for processing stabilized halogen containing organic polymers which results in a product that has a smooth uniform finish.

It is still a further objective of the present invention to provide a compound that may be used to purge polymer processing equipment efficiently and cost effectively.

Accordingly, the present invention is a stabilized halogen containing organic polymer composition comprising: (i) a halogen containing organic polymer; (ii) an acid scavenger comprising a molecular sieve or zeolite; and (iii) a heat stabilizer selected from the group consisting of mixed metal stabilizers, organotin stabilizers, lead stabilizers, metal free stabilizers or any combination of the foregoing.

The present invention also encompasses a method for processing the above-described stabilized composition comprising: (a) formulating a first stabilized halogen containing organic polymer composition comprising: (i) a halogen containing organic polymer; (ii) an acid scavenger comprising a molecular sieve or zeolite; and (iii) a heat stabilizer selected from the group consisting of mixed metal stabilizers, organotin stabilizers, lead stabilizers, metal free stabilizers, or any combination of the foregoing; (b) formulating a second stabilized halogen containing organic polymer composition comprising: (i) a halogen containing organic polymer; and (ii) a heat stabilizer selected from the group consisting of mixed metal stabilizers, organotin stabilizers, lead stabilizers, metal free stabilizers, antimony-tri-mercaptides, organic phosphates, epoxy compounds, polyols, dicarboxylic acids, aminocrotonates or any combination of the foregoing; and (c) processing the first and second stabilized compositions to form a multi-layered product wherein the first composition forms a core or substrate layer for the product and the second composition forms a cap or cover layer for the core layer.

The cover layer is thinner than the core layer and is designed to correct or mask the visual defects such as reddish color and/or the orange peel appearance that results from the use of the molecular sieve in the first composition which forms the core layer. The cover layer may be present on one or both sides of the core layer depending upon the type of product being formed.

In a preferred embodiment, the method for processing a stabilized halogen polymer comprises coextruding the first composition and the second composition so that the core of the extruded and molded product comprises from about 50 to about 99 weight percent of the product, preferably from about 70 to about 95 weight percent of the product and the cap comprises from about 1 to about 50 weight percent of the product, preferably from about 5 to about 30 weight percent of the product.

The first composition and the second composition may also further comprise, costablizers, plasticizers, lubricants, smoke suppressants, impact modifiers, UV stabilizers, fillers, pigments or any combination of the foregoing.

DETAILED DESCRIPTION OF THE INVENTION

Figure 1:
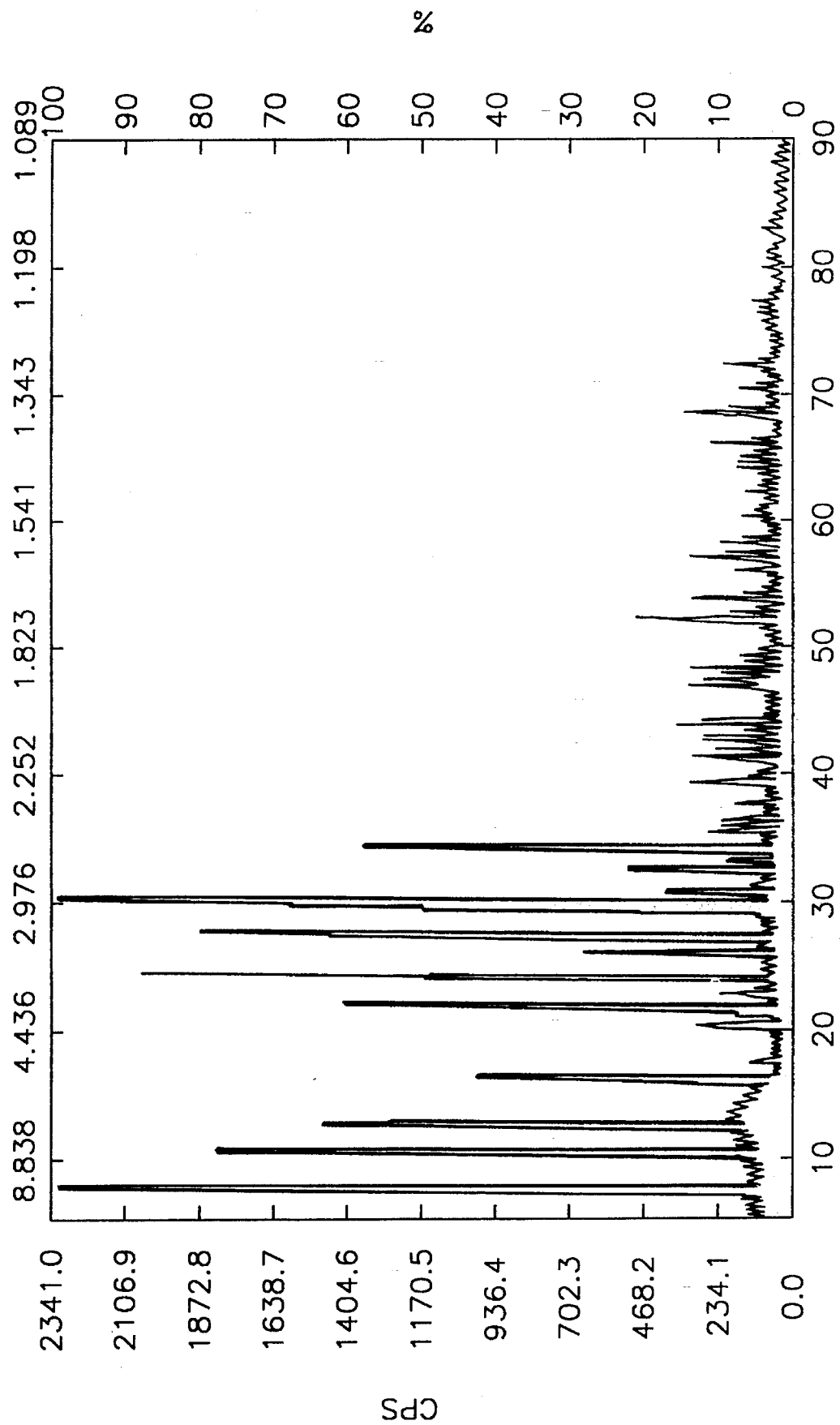
FIG. 1 is a graph of the X-ray diffraction pattern of a preferred acid scavenger used in the present invention.

Some of the halogen containing organic polymers which are useful in the present invention are halogenated polyolefin homopolymers, halogenated polyolefin copolymers, polymer blends containing a halogenated polyolefin homopolymer or copolymer, vinyl halide homopolymers, vinyl halide copolymers and polymer blends containing vinyl halide homopolymer or copolymers. The vinyl halide homopolymers, vinyl halide copolymers and polymer blends containing vinyl halide homopolymers or vinyl halide copolymers usable in the practice of this invention may be, for example, (1) polyvinyl chloride, polyvinylidene chloride, polyvinyl bromide, polyvinyl fluoride, polyvinylidene fluoride, (2) qopolymers of vinyl chloride with a copolymerizable ethylenically unsaturated monomer such as vinylidene chloride, vinyl acetate, vinyl butyrate, vinyl benzoate, diethyl fumarate, diethyl maleate, other alkyl fumarates and maleates, vinyl propionate, methyl acrylate, 2-ethylhexyl acrylate, butyl acrylate, ethyl acrylate, and other alkyl acrylates, methyl methacrylate, ethyl methacrylate, butyl methacrylate, hydroxyethyl methacrylate, and other alkyl methacrylates, methyl alpha-chloroacrylate, styrene, vinyl ethers such as vinyl ethyl ether, vinyl chloroethyl ether, vinyl phenyl ether, vinyl ketones such as vinyl methyl ketone, vinyl phenyl ketone, 1-fluoro-1-chloroethylene, acrylonitrile, chloroacrylonitrile, allylidene diacetate, chloroallylidene diacetate, ethylene and propylene and (3) polymer blends such as blends of polyvinyl chloride and polyethylene, polyvinyl chloride and chlorinated polyethylene, polyvinyl chloride and polybutylmethacrylate, polyvinyl chloride and polystyrene, polyvinyl chloride and acrylonitrile-butadiene-styrene copolymer, and polyvinyl chloride and polyethylene and polymethyl methacrylate.

Preferred halogenated organic polymers are polyvinyl chloride homopolymers, vinylchloride copolymers and chlorinated polyvinyl chloride resins as described in U.S. Pat. No. 4,710,533 and incorporated herein by reference.

Acid scavengers are a class of compounds that react with acids to form a compound that is chemically inert. Typically, an acid scavenger is slightly basic or amphoteric and will absorb the acid that is given off during degradation of the halogen containing organic polymer to form an innocuous salt without detracting from the final cured properties of the polymer. Some common acid scavengers are described in U.S. Pat. Nos. 5,190,814, 4,927,700, 4,371656 and 4,000,100 and in "Color Stability of Rigid PVC with Molybdates", *Plastics Compounding*, May/June 1990, pp. 48–49 which are incorporated herein by reference.

The preferred acid scavengers for the present invention are molecular sieves or zeolites such as those described in U.S. Pat. No. 4,000,100. The most preferred acid scavengers are sodium zeolites, particularly sodium mordenites, which have about 13 to 25% water content, a mean particle size of about 3 to 4 microns, an average pore size of about 1 to about 15 angstroms, preferably, about 3 to about 7 angstroms, and an X-ray diffraction spectra as shown in FIG. 1. The X-ray diffraction spectra shown in FIG. 1 was obtained from the powdered form of a preferred acid scavenger, commercially available from Synthetic Products Company (SYNPRO) of Cleveland, Ohio under the tradename AH-42, using a Scintag XDS 2000 diffractometer.

The acid scavenger is present in an amount of about 0.1 phr (parts per hundred parts of resin) to about 15 phr, preferably from about 0.5 phr to about 8 phr and most preferably from about 1 phr to about 6 phr.

Any of the known heat stabilizers may be used in the present invention. Preferred heat stabilizers comprise organotin compounds such as mono and dialkyltin carboxylates, mono and dialkyltin mercaptides, mixed metal stabilizers such as barium, cadmium, barium/zinc or cadmium/zinc salts of carboxylic acids and phenols, lead stabilizers such as tribasic lead sulfate, dibasic lead phosphite, dibasic lead phthalate, dibasic lead stearate, dibasic lead carbonate and lead stearate and metal free stabilizers such as 2-phenylindole and aminocrotonates.

The more preferred heat stabilizers for use in the present invention are the organotin stabilizers described in U.S. Pat. No. 4,593,059, while the most preferred organotin stabilizers are methyl tin, ethyl tin, propyl tin and butyl tin.

The heat stabilizer is present in an amount of about 0.25 phr (parts per hundred parts of resin) to about 15 phr, preferably from about 0.5 phr to about 8 phr and most preferably from about 1 phr to about 6 phr.

Costabilizers may also be employed in the present invention as well as usual adjutants such as phenolic antioxidants, anti-UV agents such as benzophones, benzotriazoles or sterically hindered amines, impact modifiers such as acrylate/butadiene/styrene and pigments or dyes.

The compositions according to the present invention may be rigid formulations, i.e., without plasticizers or semirigid formulations, i.e., with reduced plasticizer contents for applications in the building industry, the manufacture of electrical wiring or the manufacture of bottles.

The present invention may also contain a plasticizer for the production of flexible formulations for use in the food and agriculture industries. Common plasticizers are alkyl phthalate such as dactyl phthalate.

The present invention may also comprise smoke suppressant agents such as ammonium octamolybdate, commercially available from Climax Performance Materials Corporation, Norwalk, Conn. If a smoke suppressant is employed in the present invention it is preferred that the smoke suppressant be formulated with the first stabilized halogen polymer because ammonium octamolybdate can turn the halogen polymer light blue in color upon exposure to high humidity and/or UV light. It has been known in the industry to coextrude PVC compounds where the smoke suppressant is present in the core or substrate layer and not in the top coat or cap layer in order to protect the PVC sheet from UV radiation which could turn the product a blue color.

The present invention is also useful as a purging composition. A purging composition is a composition used to remove or flush out any extraneous or residue material that may remain in polymer processing equipment such as extruders or injection molders. Purging prevents the deterioration of the residue material in the processing equipment and also prevents the residue material from contaminating future uses of the machine.

The present invention can be formulated by dispersing the acid scavenger and heat stabilizer concurrently or separately with a halogen containing organic polymer in any conventional manner such as mixing, blending, stirring or shaking. In normal commercial practice the acid scavenger, heat stabilizer and any other desired additives are dispersed in the halogen containing organic polymer prior to pelletizing when the polymer is in the powder form.

The stabilized polymer compositions of this invention may be processed by any of the techniques usually employed such as extrusion, injection molding, blow molding, blow extrusion, calendaring or rotational molding.

The halogen containing organic polymer of the present invention, especially the polyvinyl chlorides and chlorinated polyvinyl chloride homo and copolymers, are particularly useful for extrusion and injection molding because the synergistic combination of the acid scavenger and heat stabilizer produces a composition that can be processed at higher temperatures with longer retention times if desired. More importantly, the unique combination of the acid scavenger and heat stabilizers allows higher processing temperatures thereby lowering the melt viscosity of the stabilized halogen containing composition allowing for greater flow rates and thereby greater output for the same run time.

The higher processing temperature and accordingly greater flow rates are particularly advantages for the method of processing a stabilized halogen polymer according to the present invention because the core layer of the coextruded and molded product forms the major percentage of the coextruded final product.

DETAILED DESCRIPTION OF A PREFERRED EMBODIMENT

The present invention will be described further in detail by reference to the following examples. The examples are for illustration and are not intended to limit the scope of the invention.

EXAMPLE 1

A composition in accordance with the present invention is prepared by mixing 100 phr of a polyvinyl chloride resin commercially available from Occidental Chemical Corp. under the trade name OXY-185; 2 phr of a sodium zeolite commercially available from Synthetic Products Co. (SYNPRO) of Cleveland, Ohio, under the trade name SYNPRON AH-42; 1 phr of a methyl tin stabilizer commercially available from Morton Internationals under the trade name TM-181; 11.25 phr of an acrylic impact modifier commercially available from Rohm & Haas Company under the trade name KM-390; 3 phr of a chlorinated polyethylene impact modifier commercially available from Dow Chemicals under the trade name TYRIN CPE 3615P; 2 phr of a UV stabilizer commercially available from Kerr McGee Chemical Corp. under the trade name $TiO_2$-CR834; 2.25 phr of a lubricant package commercially available from Rheochem under the trade name TLP 2050; and 4.0 phr of a calcium carbonate filler commercially available from ECC International under the trade name SUPERMITE in a Henschel high intensity mixer for 8–10 minutes.

The OXY-185 has a K value (DIN 53726) of 56, an inherent viscosity of 0.68, a relative viscosity of 1.82, a specific gravity of 1.40 and approximately 50% of the particles are retained on a 140 mesh.

41 grams of the resulting mixture is tested for process stability by placing the dry blend into a brabender and recording the dynamic thermal stability time and torque. This method is convenient method to determine the time required to crosslink the compound. The brabender is preheated to 190° C. and run at 60 rpms. The results of the test are reported in Table 1.

EXAMPLE 2

A composition in accordance with the present invention is prepared according to the procedure outlined in Example 1. The composition is tested according to the procedure outlined in Example 1 except the brabender is preheated to 210° C. The results are reported in Table 1.

EXAMPLE 3

A composition in accordance with the present invention is prepared according to the procedure outlined in Example 1. The composition is tested according to the procedure outlined in Example 1 except the brabender is preheated to 220° C. The results are reported in Table 1.

COMPARATIVE EXAMPLE 1

A composition not in accordance with the present invention is prepared by mixing 100 phr of a polyvinyl chloride resin commercially available from Occidental Chemical Corp. under the trade name OXY-185; 2 phr of a methyl tin stabilizer commercially available from Morton Internationals under the trade name TM-181; 11.25 phr of an acrylic impact modifier commercially available from Rohm & Haas Company under the trade name KM-390; 3 phr of a chlorinated polyethylene impact modifier commercially available from Dow Chemicals under the trade name TYRIN CPE 3615P; 2 phr of a UV stabilizer commercially available from Kerr McGee Chemical Corp. under the trade name $TiO_2$-CR834; 2.25 phr of a lubricant package commercially available from Rheochem under the trade name TLP 2050; and 4.0 phr of a calcium carbonate filler commercially available from ECC International under the trade name SUPERMITE in a Henschel high intensity mixer for 8–10 minutes.

The composition is tested according to the procedure outlined in Example 1. The results are reported in Table 1.

COMPARATIVE EXAMPLE 2

A composition not in accordance with the present invention is prepared according to the procedure outlined in Comparative Example 1.

The composition is tested according to the procedure outlined in Example 2. The results are reported in Table 1.

COMPARATIVE EXAMPLE 3

A composition not in accordance with the present invention is prepared according to the procedure outlined in Comparative Example 1.

The composition is tested according to the procedure outlined in Example 3. The results are reported in Table 1.

COMPARATIVE EXAMPLE 4

A composition not in accordance with the present invention is prepared by mixing 100 phr of a polyvinyl chloride resin commercially available from Occidental Chemical Corp. under the trade name OXY-185; 3 phr of a methyl tin stabilizer commercially available from Morton Internationals under the trade name TM-181; 11.25 phr of an acrylic impact modifier commercially available from Rohm & Haas Company under the trade name KM-390; 3 phr of a chlorinated polyethylene impact modifier commercially available from Dow Chemicals under the trade name TYRIN CPE 3615P; 2 phr of a UV stabilizer commercially available from Kerr McGee Chemical Corp. under the trade name $TiO_2$-CR834; 2.25 phr of a lubricant package commercially available from Rheochem under the trade name TLP 2050; and 4.0 phr of a calcium carbonate filler commercially available from ECC International under the trade name SUPERMITE in a Henschel high intensity mixer for 8–10 minutes.

The composition is tested according to the procedure outlined in Example 1. The results are reported in Table 1.

COMPARATIVE EXAMPLE 5

A composition not in accordance with the present invention is prepared according to the procedure outlined in Comparative Example 4.

The composition is tested according to the procedure outlined in Example 2. The results are reported in Table 1.

COMPARATIVE EXAMPLE 6

A composition not in accordance with the present invention is prepared according to the procedure outlined in Comparative Example 4.

The composition is tested according to the procedure outlined in Example 3. The results are reported in Table 1.

TABLE 1

| EXAMPLE # | TEMP. (°C.) | DTS time (min.) | Torque (m-g) |
| --- | --- | --- | --- |
| 1 | 190 | 70 | 1100 |
| 2 | 210 | 33 | 800 |
| 3 | 220 | 25 | 750 |
| 1* | 190 | 25 | 1250 |
| 2* | 210 | 16 | 1000 |
| 3* | 220 | 12.5 | 900 |
| 4* | 190 | 29.5 | 1250 |
| 5* | 210 | 17 | 1025 |
| 6* | 220 | 13.5 | 950 |

* = comparative examples

The results reported in Table 1 show that compositions prepared in accordance with the present invention, Examples 1–3, exhibit improved processing stability as compared to compositions not prepared in accordance with the present invention, Comparative Examples 1–6. Specifically, the compositions prepared in accordance with the present invention, Examples 1–3 have longer dynamic thermal stability times and lower torques than the compositions prepared not in accordance with the present invention, Comparative Examples 1–6. In fact the compositions prepared in accordance with the present invention, Examples 1–3, have dynamic thermal stability times that are almost double the dynamic thermal stability times for the compositions not prepared in accordance with the present invention, Comparative Examples 1–6.

Furthermore the results of Table 1 show that compositions prepared in accordance with the present invention are useful as purging compositions because they employ less heat stabilizers which are expensive. In addition compositions prepared in accordance with the present invention have a higher flow due to the ability of the compositions in accordance with the present invention to be processed at higher temperatures. The higher flow results in shorter purging times and therefore down times for the processing equipment are reduced and production increased.

EXAMPLE 4

A composition in accordance with the present invention is prepared according to the procedure outlined in Example 1.

The composition is tested according to the procedure outlined in Example 1 except the composition is removed from the brabender after 12 minutes and visually inspected for color. The results are reported in Table 2.

EXAMPLE 5

A composition in accordance with the present invention is prepared according to the procedure outlined in Example 1.

The composition is tested according to the procedure outlined in Example 2 except the composition is removed from the brabender after 12 minutes and visually inspected for color. The results are reported in Table 2.

EXAMPLE 6

A composition in accordance with the present invention is prepared according to the procedure outlined in Example 1.

The composition is tested according to the procedure outlined in Example 3 except the composition is removed from the brabender after 12 minutes and visually inspected for color. The results are reported in Table 2.

COMPARATIVE EXAMPLE 7

A composition in accordance with the present invention is prepared according to the procedure outlined in Comparative Example 1.

The composition is tested according to the procedure outlined in Comparative Example 1 except the composition is removed from the brabender after 12 minutes and visually inspected for color. The results are reported in Table 2.

COMPARATIVE EXAMPLE 8

A composition in accordance with the present invention is prepared according to the procedure outlined in Comparative Example 2.

The composition is tested according to the procedure outlined in Comparative Example 2 except the composition is removed from the brabender after 12 minutes and visually inspected for color. The results are reported in Table 2.

COMPARATIVE EXAMPLE 9

A composition in accordance with the present invention is prepared according to the procedure outlined in Comparative Example 3.

The composition is tested according to the procedure outlined in Comparative Example 3 except the composition is removed from the brabender after 12 minutes and visually inspected for color. The results are reported in Table 2.

COMPARATIVE EXAMPLE 10

A composition in accordance with the present invention is prepared according to the procedure outlined in Comparative Example 4.

The composition is tested according to the procedure outlined in Comparative Example 1 except the composition is removed from the brabender after 12 minutes and visually inspected for color. The results are reported in Table 2.

COMPARATIVE EXAMPLE 11

A composition in accordance with the present invention is prepared according to the procedure outlined in Comparative Example 4.

The composition is tested according to the procedure outlined in Comparative Example 2 except the composition is removed from the brabender after 12 minutes and visually inspected for color. The results are reported in Table 2.

COMPARATIVE EXAMPLE 12

A composition in accordance with the present invention is prepared according to the procedure outlined in Comparative Example 4.

The composition is tested according to the procedure outlined in Comparative Example 3 except the composition is removed from the brabender after 12 minutes and visually inspected for color. The results are reported in Table 2.

TABLE 2

| EXAMPLE # | BRABENDER TEMP (°C.) | COLOR |
|---|---|---|
| 4 | 190 | white |
| 5 | 210 | slightly yellow |
| 6 | 220 | light gray |
| 7* | 190 | yellow |
| 8* | 210 | green |
| 9* | 220 | completely degraded |
| 10* | 190 | white |
| 11* | 210 | slightly yellow |
| 12* | 220 | almost degraded |

* = comparative examples

The results of Table 2 are further evidence that compositions prepared in accordance with the present invention, Examples 4–6, exhibit improved process stability. Discoloration is an indicator of polyvinyl chloride degradation. Clearly, the compositions prepared in accordance with the present invention maintain their color at higher temperatures than the compositions not prepared in accordance with the present invention, Comparative Examples 7–12.

EXAMPLE 7

A composition in accordance with the present invention is prepared by mixing 100 phr of a chlorinated polyvinyl chloride resin commercially available from B F Goodrich under the trade name 677x670; 2 phr of a sodium zeolite commercially available from Synthetic Products Co. under the trade name SYNPRON AH-42; 4 phr of methyl tin commercially available from Morton Internationals under the trade name TM-181; 21 phr of a heat distortion modifier commercially available from Rohm & Haas Company under the trade name HT-510; 24 phr of a chlorinated polyethylene impact modifier commercially available from Dow Chemicals under the trade name TYRIN CPE 3615P; 8.75 phr of a UV stabilizer commercially available from Kerr McGee Chemical Corp. under the trade name $TiO_2$-CR834; 2 phr of a lubricant commercially available from Allied Signal under the trade name AC 629A; 0.5 phr of a lubricant commercially available from Hoechst Co. under the trade name E WAX; and 0.75 phr of carbon black in a Henschel high intensity mixer for 8–10 minutes.

The CPVC 677x670 has 67% chlorine by weight, a K value of 56.8, an inherent viscosity of 0.68, a specific gravity of 1.57, average particle size of 118 microns and a glass transition temperature of 130° C.

The resulting mixture was tested for processing stability according to the procedure outlined in Example 1. The results are reported in Table 3.

EXAMPLE 8

A composition in accordance with the present invention is prepared according to the procedure outlined in Example 7 except that 4 phr of the sodium zeolite, AH-42, is added to the composition.

The composition is tested according to the procedure outlined in Example 1. The test results are reported in Table 3.

COMPARATIVE EXAMPLE 13

A composition not in accordance with the present invention is prepared by mixing 100 phr of a chlorinated polyvinyl chloride resin commercially available from B F Goodrich under the trade name 677x670; 4 phr of methyl tin commercially available from Morton Internationals under the trade name TM-181; 21 phr of a heat distortion modifier commercially available from Rohm & Haas Company under the trade name HT-510; 24 phr of a chlorinated polyethylene impact modifier commercially available from Dow Chemicals under the trade name TYRIN CPE 3615P; 8.75 phr of a UV stabilizer commercially available from Kerr McGee Chemical Corp. under the trade name $TiO_2$-CR834; 2 phr of a lubricant commercially available from Allied Signal under the trade name AC 629A; 0.5 phr of a lubricant commercially available from Hoechst Co. under the trade name E WAX; and 0.75 phr of carbon black in a Henschel high intensity mixer for 8–10 minutes.

The CPVC 677x670 has 67% chlorine by weight, a K value of 56.8, an inherent viscosity of 0.68, a specific gravity of 1.57, average particle size of 118 microns and a glass transition temperature of 130° C.

The resulting mixture was tested for processing stability according to the procedure outlined in Example 1. The results are reported in Table 3.

TABLE 3

| EXAMPLE # | BRABENDER TEMP (°C.) | DTS TIME (min) | Torque (m-g) |
| --- | --- | --- | --- |
| 7 | 190 | 21 | 2050 |
| 8 | 190 | 23 | 2000 |
| 13* | 190 | 11 | 2050 |

* = comparative example

The results reported in Table 3 show that compositions prepared in accordance with the present invention, Examples 7 and 8, exhibit improved processing stability as compared to compositions not prepared in accordance with the present invention, Comparative Example 13. Specifically, the compositions prepared in accordance with the present invention, Examples 7 and 8 have longer dynamic thermal stability times than the compositions prepared not in accordance with the present invention, Comparative Example 13. More importantly the compositions prepared in accordance with the present invention, Examples 7 and 8, have dynamic thermal stability times that are double the dynamic stability times for the compositions not prepared in accordance with the present invention, Comparative Example 13.

EXAMPLE 9

A method for processing the stabilized halogen containing polymers in accordance with the present invention is conducted by formulating approximately 878.5 lbs of a composition as described in Example 1 and formulating approximately 871.5 lbs of a composition as described in Comparative Example 1. The compositions are coextruded using a CM 55 and CM 80 twin screw extruder commercially available from Cincinnati Milacron Company. The product is extruded through a single feed block die into a sheet form.

The formulation of Example 1 which contains the acid scavenger is extruded in CM 80 with a barrel temperature profile of 315°–325°–335°–345° F. die temperature of 350° F., extruder amps of 97–98 and screw thrust of 31–32%.

The formulation of Comparative Example 1 which does not contain the acid scavenger is extruded in CM 55 with a barrel temperature profile of 300°–310°–320°–330° F., die temperature of 350° F., extruder amps of 28–30 and screw thrust of 40–42%.

The feed block die is maintained at a temperature of 335° F. and has a die size of 44 inches.

This coextrusion process results in a sheet that is approximately 70% core or substrate layer wherein the core comprises the formulation of Example 1 and approximately 30% cap or cover layer wherein the cap comprises the formulation of Comparative Example 1.

The final sheet product exhibits all the beneficial properties of a zeolite stabilized product without exhibiting the aesthetically unacceptable properties such as an orange peel appearance or a reddish color. The final sheet product also has the additional advantage of allowing the formulator to reduce the amount of expensive tin stabilizer employed in the final product resulting in a reduction in the cost of the final product.

COMPARATIVE EXAMPLE 14

A method for processing halogen containing polymers not in accordance with the present invention is conducted by formulating approximately 895 lbs of a composition as described in Comparative Example 1 and formulating approximately 895 lbs of a composition as described in Comparative Example 1. The compositions are coextruded using a CM 55 and CM 80 twin screw extruder as described in Example 9. The product is extruded through a single feed block die into a sheet form.

The formulation extruded in CM 80 is processed with a barrel temperature profile of 300°–310°–320°–330° F., die temperature of 350° F., extruder amps of 91–92 and screw thrust of 31–32%.

The formulation extruded in CM 55 is processed with a barrel temperature profile of 300°–310°–320°–330° F., die temperature of 350° F., extruder amps of 28–30 and screw thrust of 40–42%.

The feed block die is maintained at a temperature of 335° F. and has a die size of 44 inches.

This coextrusion process results in a sheet that is approximately 70% core or substrate layer from the CM 80 extruder and approximately 30% cap or cover layer from the CM 55 extruder The final sheet product does not exhibit the beneficial properties of a zeolite stabilized product.

EXAMPLE 10

Another preferred method for processing the stabilized halogen containing polymers in accordance with the present invention is conducted by formulating approximately 978 lbs of a composition as described in Example 7 and formulating approximately 966 lbs of a composition as described in Comparative Example 13. Both compositions are coextruded using a CM 55 and CM 88 twin screw extruder as described in Example 9. The product is extruded through a single feed block die into a sheet form.

The formulation of Example 7 which contains the acid scavenger, is extruded in CM 80 with a barrel temperature profile of 295°–305°–315°–325° F. die temperature of 350° F. extruder amps of 80–82 and screw thrust of approximately 30%.

The formulation of Comparative Example 13 which contains the acid scavenger is extruded in CM 55 with a barrel temperature profile of 280°–290°–300°–310° F., die temperature of 350° F. extruder amps of 28–30 and screw thrust of approximately 40–42%.

The feed block die is maintained at a temperature of 330° F. and has a die size of 44 inches.

This coextrusion process results in a sheet that is approximately 70% core wherein the core comprises the formulation of Example 7 and approximately 30% cap wherein the cap comprises the formulation of Comparative Example 13.

The final sheet product exhibits all the beneficial properties of a zeolite stabilized product without exhibiting the aesthetically unacceptable properties such as an orange peel appearance or a reddish color. The final sheet product also has the additional advantage of allowing the formulator to reduce the amount of expensive tin stabilizer employed in the final product resulting in a reduction in the cost of the final product.

COMPARATIVE EXAMPLE 15

An attempt to coextrude the chlorinated polyvinylchloride composition of Cmaparative Example 13 is conducted by formulating approximately 895 lbs of a composition as described in Comparative Example 13 and formulating approximately 895 lbs of a composition as described in Comparative Example 13. These compositions could not be coextruded using the above described coextruder because the melt viscosity of the polymer melt genereates a screw thrust above the processing limit of the extruder.

While the invention has been described in detail and with reference to specific embodiments, it will be apparent to one of ordinary skill in the art that various changes and modifications can be made herein without departing from the spirit and scope thereof such as employing antimony-tris-mercaptides as the heat stabilizer and or using additional costabilizers. Additionally, injection molding rather than coextrusion may also be used to process the present invention.

All the above mentioned patents, publications and test methods are herein incorporated by reference.

I claim:

1. A method for processing a stabilized halogen containing organic polymer composition comprising:
   (a) formulating a first stabilized halogen containing organic polymer composition comprising: (i) a halogen containing organic polymer; (ii) an acid scavenger comprising a sodium zeolite; and (iii) a heat stabilizer selected from the group consisting of mixed metal stabilizers, organotin stabilizers, lead stabilizers, metal free stabilizers or any combination of the foregoing;
   (b) formulating a second stabilized halogen containing organic polymer composition comprising: (i) a halogen containing organic polymer; and (ii) a heat stabilizer selected from the group consisting of mixed metal stabilizers, organotin stabilizers, lead stabilizers, metal free stabilizers, antimony-tris-mercaptides, organic phosphates, epoxy compounds, polyols, dicarboxylic acids, aminocrotonates or any combination of the foregoing; and
   (c) processing the first and second stabilized compositions to form a multi-layered product wherein the first composition forms a core layer comprising from about 50 to about 99 weight percent of the product and the second composition forms a cap layer comprising from about 1 to about 50 weight percent of the product and wherein the first composition is processed at a higher temperature and with a greater output than the second composition.

2. A method as defined in claim 1 wherein the core layer comprises from about 70 to about 95 weight percent of the product and the cap layer comprises from about 5 to about 30 weight percent of the product.

3. A method as defined in claim 1 wherein the zeolite is sodium mordenite.

4. (Amended) A method as defined in claim 1 wherein the zeolite is a sodium zeolite with about 13 to 25% water content, a mean particle size of about 3 to about 4 microns and an average pore size of about 3 to about 7 angstroms.

5. A method as defined in claim 1 wherein the first composition and the second composition further comprise, costablizers, plasticizers, lubricants, smoke supressants, impact modifiers, UV stabilizers, fillers, pigments or any combination of the foregoing.

6. A method as defined in claim 1 wherein the first and second compositions are processed by coextruding the first and second compositions.

7. A method as defined in claim 6 wherein the first and second compositions are processed by coextruding the first and second compositions into a single feed block die.

8. A method as defined in claim 7 further comprising the step of forming the multi-layered product into a sheet.

9. A method for processing a stabilized halogen containing organic polymer composition consisting essentially of:
   (a) formulating a first stabilized halogen containing organic polymer composition consisting essentially of: (i) a halogen containing organic polymer; (ii) an acid scavenger comprising a sodium zeolite with about 13 to 25% water content, a mean particle size of about 3 to about 4 microns and an average pore size of about 3 to about 7 angstroms; (iii) a heat stabilizer selected from the group consisting of mixed metal stabilizers, organotin stabilizers, lead stabilizers, metal free stabilizers or any combination of the foregoing; and (iv) costablizers, plasticizers, lubricants, smoke supressants, impact modifiers, UV stabilizers, fillers, pigments or any combination of the foregoing;
   (b) formulating a second stabilized halogen containing organic polymer composition consisting essentially of: (i) a halogen containing organic polymer; (ii) a heat stabilizer selected from the group consisting of mixed metal stabilizers, organotin stabilizers, lead stabilizers, metal free stabilizers, antimony-tris-mercaptides, organic phosphates, epoxy compounds, polyols, dicarboxylic acids, aminocrotonates or any combination of the foregoing; and (iii) costablizers, plasticizers, lubricants, smoke supressants, impact modifiers, UV stabilizers, fillers, pigments or any combination of the foregoing; and
   (c) coextruding the first and second stabilized compositions to form a multi-layered product wherein the first composition forms a core layer comprising from about 50 to about 99 weight percent of the product and the second composition forms a cap layer comprising from about 1 to about 50 weight percent of the product and wherein the first composition is processed at a higher temperature and with a greater output than the second composition.

* * * * *